QUICK-ACTING CLAMPING DEVICE

Filed April 3, 1958 5 Sheets-Sheet 1

INVENTOR.
JOSEPH VERDERBER
BY Isler & Ornstein
ATTORNEYS

INVENTOR.
JOSEPH VERDERBER
BY Isler & Ornstein
ATTORNEYS

Nov. 24, 1959 J. VERDERBER 2,913,941
QUICK-ACTING CLAMPING DEVICE
Filed April 3, 1958 5 Sheets-Sheet 3
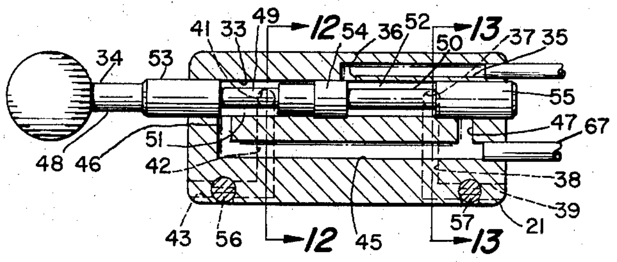
Fig. 7
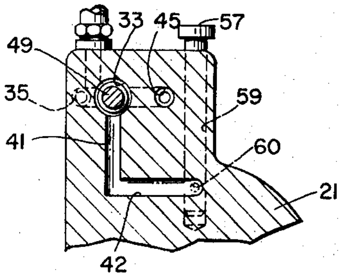
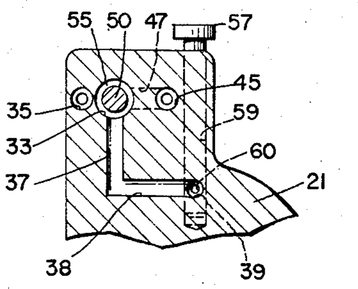
Fig. 12 Fig. 13
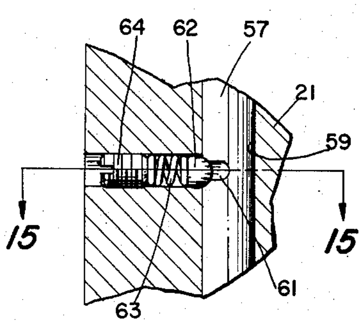
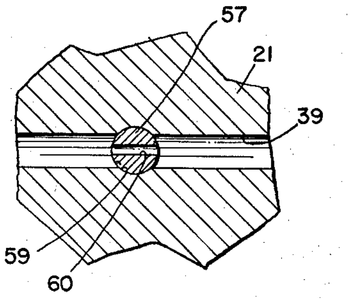
Fig. 14 Fig. 16
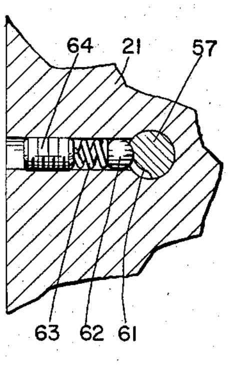
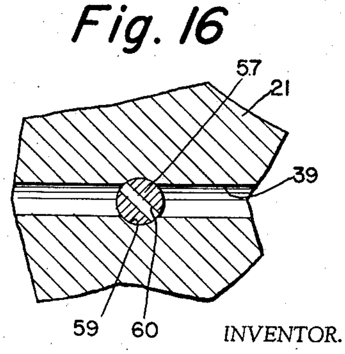
Fig. 17
Fig. 15
INVENTOR.
JOSEPH VERDERBER
BY Isler & Ornstein
ATTORNEYS INVENTOR.
JOSEPH VERDERBER
BY Isler & Ornstein
ATTORNEYS Nov. 24, 1959 J. VERDERBER 2,913,941

QUICK-ACTING CLAMPING DEVICE

Filed April 3, 1958 5 Sheets-Sheet 5

INVENTOR.
JOSEPH VERDERBER
BY Isler & Ornstein
ATTORNEYS 2,913,941

QUICK-ACTING CLAMPING DEVICE

Joseph Verderber, Cleveland, Ohio

Application April 3, 1958, Serial No. 726,083

8 Claims. (Cl. 81—17.2)

This invention contemplates a quick-acting clamping device which, in addition to utilizing a compressed fluid, such as air, as an actuating medium, also employs a rack-and-gear mechanism for actuating the clamping member.

A primary object of the invention is to provide a device of the character described, in which a novel rack-and-gear mechanism is employed, with the rack constituting an integral part of a cylinder and piston arrangement.

Another object of the invention is to provide a novel valve means for controlling the speed of actuation of the clamping member.

A further object of the invention is to provide novel means for automatically lubricating certain movable parts of the mechanism.

A further object of the invention is to provide means for insuring that the clamping member 14 is in its highest or locking position, when setting up the device for a particular job or workpiece.

A still further object of the invention is to provide a novel muffler for muffling the exhaust air.

Other objects and advantages of my invention will be apparent during the course of the following description.

In the accompanying drawings forming a part of this specification, and in which like numerals are employed to designate like parts throughout the same.

Fig. 7 is a fragmentary cross-sectional view, taken on the line 7—7 of Fig. 3;

Fig. 12 (see Sheet No. 3) is a fragmentary cross-sectional view, taken on the line 12—12 of Fig. 7;

Fig. 13 is a fragmentary cross-sectional view, taken on the line 13—13 of Fig. 7;

Fig. 14 is a fragmentary cross-sectional view, on an enlarged scale, taken on the line 14—14 of Fig. 3;

Fig. 15 is a fragmentary cross-sectional view, taken on the line 15—15 of Fig. 14;

Fig. 16 is a fragmentary cross-sectional view, on an enlarged scale, taken on the line 16—16 of Fig. 9;

Fig. 17 is a view similar to Fig. 16 but showing the air control valve in the "slow" position;

Figure 1:
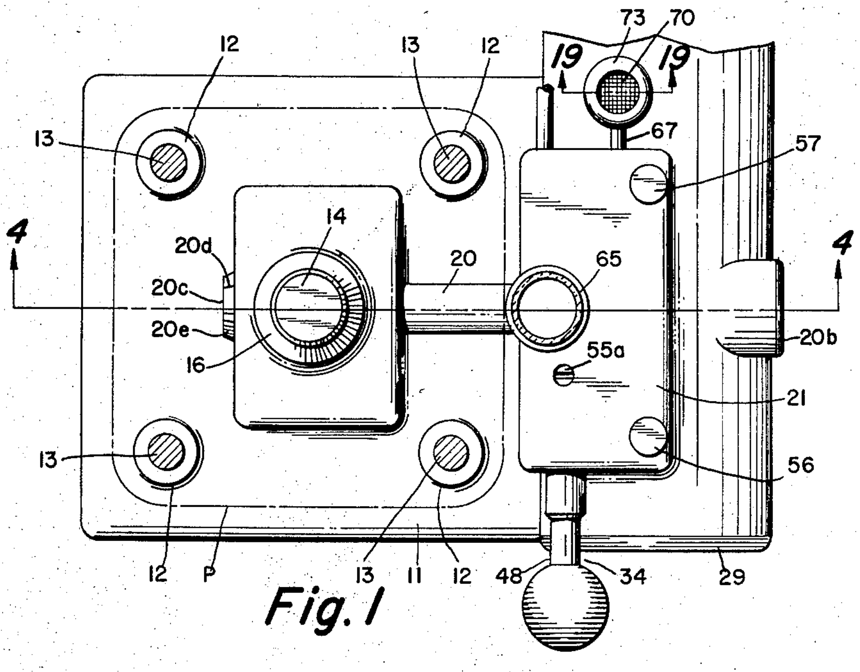
Fig. 1 is a view, partly in top plan, and partly in section, of the clamping device.
Figure 2:
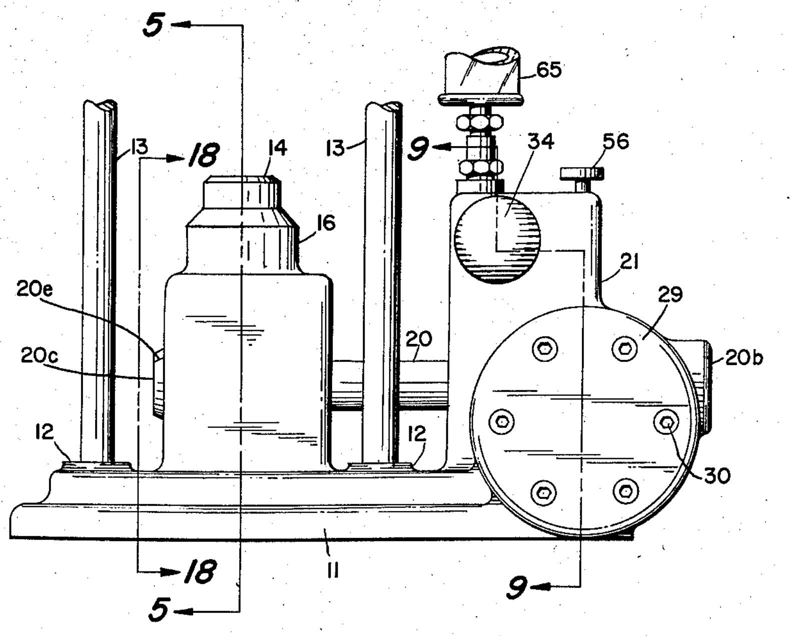
Fig. 2 is a front elevation of the device.

Referring more particularly to the drawings, the clamping device is seen to comprise a heavy cast-iron base 11, the four corners of which are provided with cylindrical embossments 12, in which are secured heavy posts 13, which serve to support a top plate P, shown in dotted outline in Fig. 1.

Located centrally of the base 11 is a clamping plunger 14, which is slidably received in a vertical bore 15 which extends through an embossment 16 on the base 11, and is closed at its lower end by a cap (not shown) which is secured to the base 11 by means of cap screws.

The plunger 14 is actuated to a raised or clamping position and to a lowered or nonclamping position by means of a cam 19, which is keyed to a horizontal cam shaft 20, and is actuated by rotation of said shaft.

The shaft 20 is journaled for rotation in a housing 21 which is formed integrally with the base 11 and which houses various parts to be now described, including a rack, a control valve for the air, and a lubricating device.

The cam shaft 20 is provided with a pinion 22 which is in mesh with a rack 23, which is formed as part of of a piston 24 having heads 25 and 26. The piston 24 and the head 25 are slidable in a cylinder 27 of the housing 21, while the head 26 is slidable in a cylinder 28 which is of somewhat larger diameter than the cylinder 27 and is formed as a counterbore of the latter.

The cylinder 27 is closed at its outer end by a head 29, which is secured to the housing 21 by screws 30, and the cylinder 28 is closed at its outer end by a head 31 which is also secured to the housing 21 by screws.

For the purpose of admitting air, under pressure, into the cylinders 27 and 28, for the purpose of actuating the piston 24, the housing 21 is provided with a multiplicity of passageways.

The passageways include a horizontal bore or cylinder 33, in which a control valve, generally designated by numeral 34, is mounted for slidable movement. The function of this valve will be described after all of the air passageways have been described.

Extending parallel with the bore or cylinder 33 is an air inlet passageway 35, which communicates with the cylinder 33 through a port 36. Extend.ng vertically through the housing 21 from the cylinder 33 is a passageway 37, which communicates with a horizontal passageway 38 (Fig. 13), which, in turn, communicates with a horizontal passageway 39, the outer end of which communicates with the cylinder 28 through a passageway 40 formed in the head 31.

Extending vertically through the housing 21 from the cylinder 33 is a passageway 41 which communicates with a horizontal passageway 42, which, in turn, communicates with a horizontal passageway 43, the outer end of which communicates with the cylinder 27 through a passageway 44 formed in the head 29.

An air exhaust passageway 45 is also formed in the housing 21 and extends generally parallel to the air inlet passageway 35. The passageway 45 communicates with the cylinder 33 through passageways 46 and 47 (see Fig. 7).

The control valve 34 to which reference has been made includes a valve stem 48 having portions 49 and 50 of reduced diameter, which define annular passageways 51 and 52 respectively within the bore 33. Adjacent the portions 49 and 50 are bearing portions 53, 54 and 55.

Figures 8, 9:
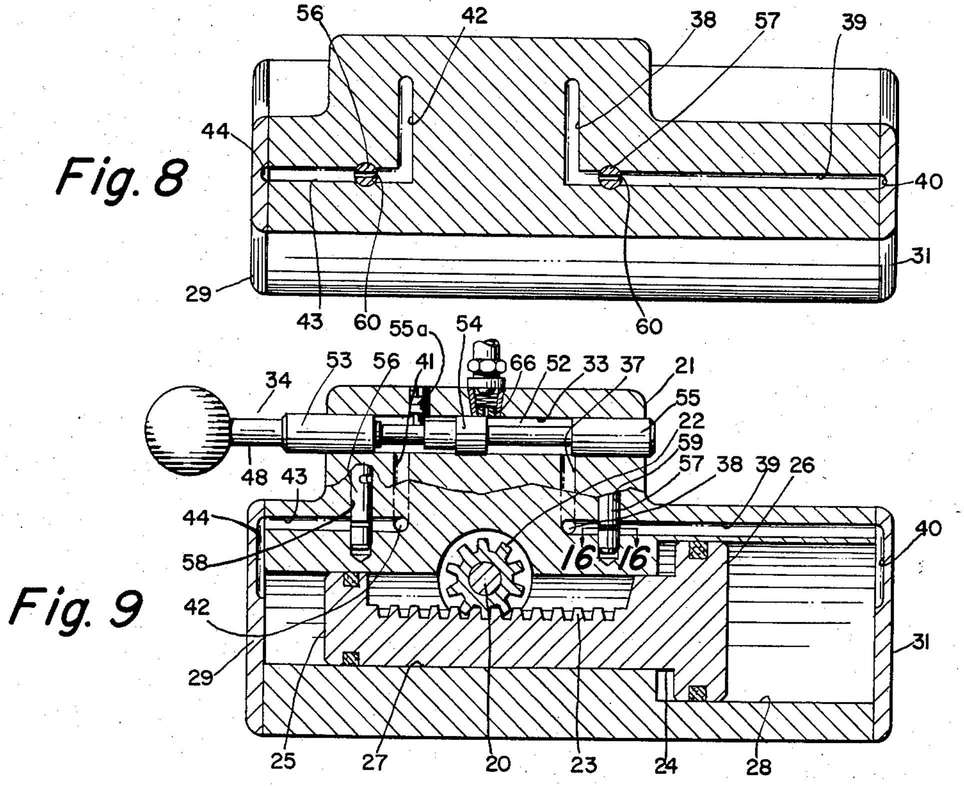
Fig. 8 (see Sheet No. 4) is a fragmentary cross-sectional view, taken on the line 8—8 of Fig. 3.
Fig. 9 is a fragmentary cross-sectional view, taken on the line 9—9 of Fig. 2.

As shown in Figs. 1 and 9, a screw 55*a* having a stem extending into the bore 33 is used both as a means of preventing axial displacement of the valve 34 from the bore, and as a means for stopping the valve in its two operative or open positions.

Figure 10:
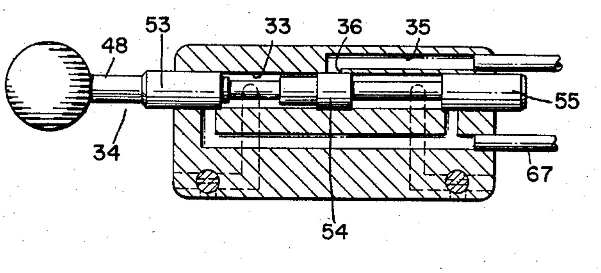
Fig. 10 is a view similar to Fig. 7, but showing the valve in the neutral position.

The operation of the device may now be described as follows:

With the valve stem 48 in the neutral position shown in Fig. 10, the valve is closed, since compressed air is prevented from entering the cylinder 33, because the air inlet port 36 is blocked by the portion 54 of the valve 34.

Figure 11:
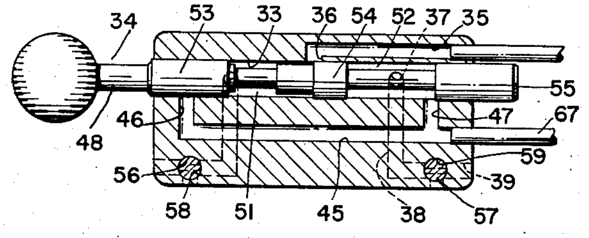
Fig. 11 is a view similar to Fig. 7, but showing the valve in the clamping or locking position.

If the valve stem is moved to the position shown in Fig. 11, air flows from the passageway 35 through the port 36 into the annular passageway 51, thence through the passageways 41, 42, 43 and 44 into the cylinder 27, causing the piston 24 to move to the right, as viewed in Fig. 9, and rotating the cam shaft to elevate the clamping plunger 14 to a position in which it clamps the work to the top plate P.

During this movement of the piston 24, the air within the cylinder 28 is forced out of the cylinder by the head 26, and escapes through the passageways 40, 39, 38, 37, 52 and 47, into the air exhaust passageway 45, from which it is discharged into the atmosphere.

If the valve stem 48 is moved to the position shown in Fig. 7, air flows from the passageway 35 through the port 36 into the annular passageway 52, thence through the passageways 37, 38, 39, and 40 into the cylinder 28, causing the piston 24 to be moved to the position shown in Fig. 9, and rotating the cam shaft to lower the clamping plunger 14 to a position in which it unclamps the work from the top plate P.

During this movement of the piston 24, the air within the cylinder 27 is forced out of the cylinder by the head 25, and escapes through the passageways 44, 43, 42, 41, 51 and 46, into the air exhaust passageway 45, from which it is discharged into the atmosphere.

Means have also been provided for controlling the speed of movement of the piston 24, and thereby the speed of the clamping and unclamping action. Such means is best illustrated in Figs. 1, 2, 3 and 7 to 17 inclusive of the drawings, and comprises valves 56 and 57 which are disposed in bores 58 and 59 respectively of the housing 21. These valves are provided with passageways 60 extending diametrically therethrough, which passageways are adapted to be aligned with the passageways 43 and 39 (see Figs. 8 and 16), and when thus aligned, the maximum volume of air passes through the passageways 43 or 39, and a maximum speed of movement of the piston 24 is effected.

The valves 56 and 57 may be rotated to the position shown in Fig. 17, in which position, the passageway 60 is partially closed by the wall of the bores 58 or 59, so that a lesser volume of air is permitted to pass through the passageways 43 or 39, and a half-speed of movement of the piston 24 is effected.

For the purpose of maintaining the valves 56 and 57 in proper axial position and against axial displacement, these valves are provided with arcuate recesses or grooves 61, as best shown in Figs. 14 and 15, and a ball 62 is resiliently urged into this recess, as by means of a compression spiral spring 63, retained against the ball by a setscrew 64. The ends of the recess 61 form stops which, when engaged by the ball 62, determine the two positions of the valves 57 or 56, which are shown in Figs. 16 and 17.

Means have also been provided for automatically lubricating the bore 33 as well as the walls of the cylinders 27 and 28, so that the parts which are movable in the bore and cylinders are movable in a frictionless manner, thereby greatly facilitating the speed of operation of the device.

For this purpose, a wick-feed oiler 65 is provided, which is mounted on the housing 21, and supplies oil to the cylinder 33 through a spring-pressed ball check valve 66, this valve communicating with the cylinder 33 at a point directly above the port 36, as best shown in Fig. 9.

Each time that air is admitted into the port 36, the ball of the check valve 66 is retracted, and a drop of oil is sucked through the port 36, becoming atomized by the air, so as to cause it to coat the walls of the bores and cylinders to which reference has been made. At the conclusion of the air-admitting operation, the check valve 66 will automatically close, so that oil is not wasted by gravity flow. This method of lubricating the parts is thus not only an automatic one, but is highly efficient and inexpensive.

Figure 4:
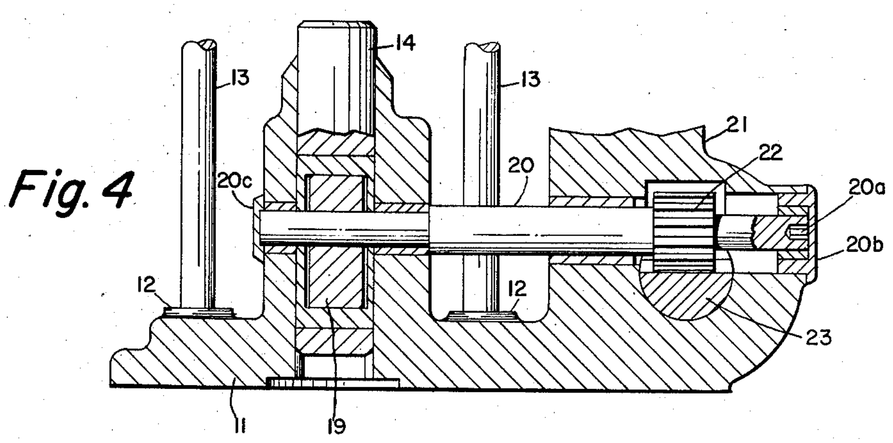
Fig. 4 is a fragmentary cross-sectional view, taken on the line 4—4 of Fig. 1.
Figure 5:
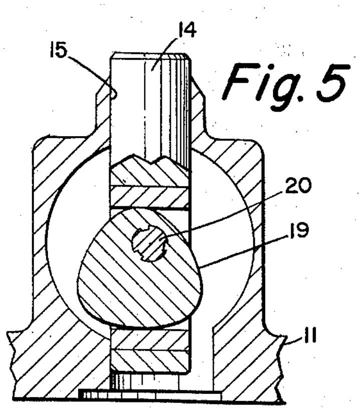
Fig. 5 is a fragmentary cross-sectional view, taken on the line 5—5 of Fig. 2.
Figure 18:
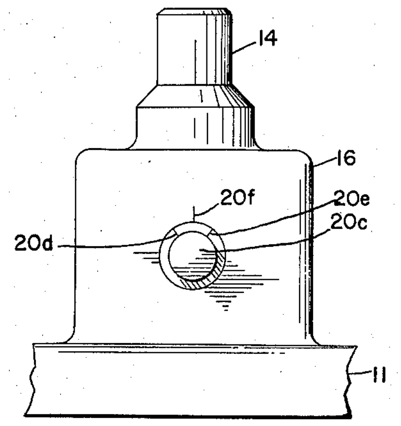
Fig. 18 (see Sheet No. 5) is a fragmentary elevation of the device, as indicated by the arrows 18—18 of Fig. 2.

Means have also been provided for insuring that the clamping member 14 is in its highest or locking position, when setting up the device for a particular job. For this purpose, one end of the cam shaft 20 is provided with a socket recess 20*a* (Fig. 4), which is normally covered by a cap 20*b*, which is removably secured to the housing 21. The other end of the shaft 20 has secured thereto a cap 20*c*, provided with circumferentially spaced index marks 20*d* and 20*e* (Fig. 18), which are used in conjunction with a fixed index mark 20*f* on the embossment 16 of the base 11.

Figure 6:
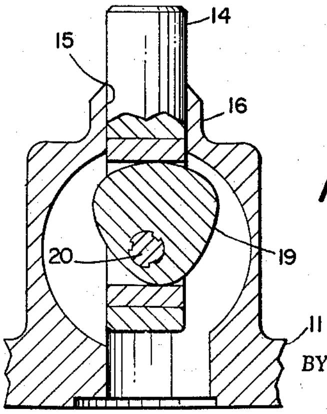
Fig. 6 is a view similar to Fig. 5, but showing the clamping plunger in raised or clamping position.

When it is desired to set the device up for a particular job, the cover or cap 20*b* is removed, and the shaft 20 is rotated, as by means of an Allen wrench, inserted in the recess 20*a* until the index mark 20*f* is approximately halfway between the marks 20*d* and 20*e* on the cap 20*c*. At this position of the shaft 20, the clamping plunger 14 is in its highest or locking position which is shown in Fig. 6.

The work to be clamped is then placed against the top of the clamping plunger and the top plate P, and the top plate adjusted to bring it into contact with the work. In this way, the device can be quickly and easily set up for clamping the work.

Figure 3:
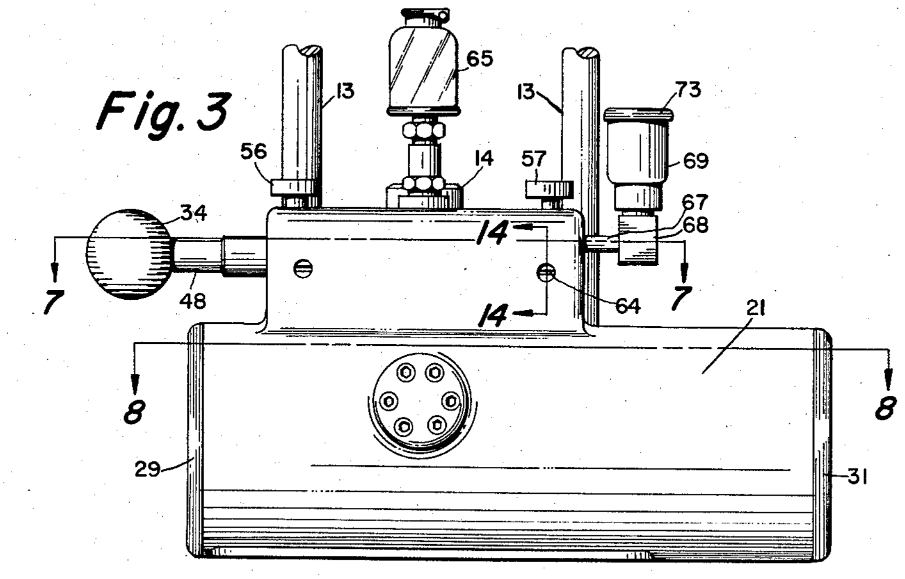
Fig. 3 is an end elevation of the device, as viewed from the right end of Fig. 1.
Figure 19:
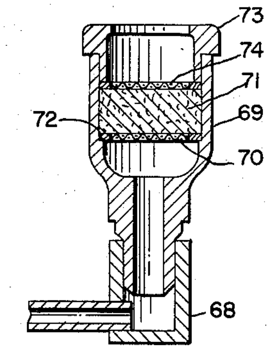
Fig. 19 is an enlarged cross-sectional view, taken on the line 19—19 of Fig. 1.

Means have also been provided for muffling the sound of the exhaust air from the passageway 45, such means being best illustrated in Figs. 1, 3 and 19.

For this purpose, a conduit 67 extends from the passageway 45 and is connected to a coupling 68 into which a muffler 69 is screwed. The muffler 69 has mounted therein a pair of spaced screens 70, between which a filling 71 of cotton or similar material is interposed. The screens and filling are secured between a shoulder 72 of the muffler and a cap 73, as best seen in Fig. 19.

It is thus seen that I have provided an efficient clamping device, all of the parts of which are readily removable for repair or replacement purposes, and which consists of a minimum number of operating parts.

By employing a rack which is, in effect, a part of the cylinder and piston driving mechanism, a saving in parts is effected, and at the same time, the rack and gear are effectively lubricated by the same means which lubricates the cylinder and piston.

The valves for controlling the speed of operation are simple and readily accessible, and are operable by a simple twisting or turning movement.

Due to the fact that the area of the piston head 26 is considerably greater than that of the piston head 24, the total force or momentum imparted to the head 26 will be substantially greater than that applied to the head 24, so that a strong unclamping action is applied to the plunger 14. This has been found to be highly advantageous in a device of this character.

It is to be understood that the form of my invention, herewith shown and described, is to be taken as a preferred example of the same, and that various changes may be made in the shape, size and arrangement of parts of my invention, without departing from the function of the invention or the scope of the subjoined claims.

Having thus described my invention, I claim:

1. In a clamping device, the combination of a base, a top plate supported by said base, a clamping rod slidably mounted in said base, a cam for actuating said rod, a cam shaft for rotating said cam, a pinion mounted on said cam shaft, a cylinder having a portion of relatively small diameter and a portion of relatively large diameter, a piston movable in said cylinder, said piston having a head of substantially the same diameter as said cylinder portion of small diameter, a head of substantially the same diameter as said cylinder portion of large diameter, and a portion intermediate said heads of substantially semi-circular cross-section having rack teeth on its diametrical face, said rack portion adapted for rotation of said pinion, and fluid means for actuating said piston.

2. A clamping device, as defined in claim 1, in which said cylinder is closed at its ends by means of heads which are removable from said cylinder, said last-named heads having passageways in their inner faces through which the fluid for actuating the piston is admitted into said cylinder.

3. In a clamping device, clamping means, fluid-actuated means for moving said clamping means, and means for controlling the speed of movement of said fluid-actuated means, said means comprising control valves having arcuate-grooves in their outer surfaces, and spring-pressed balls disposed in said grooves and determining the circumferential position of the valves.

4. In a clamping device, a housing having a bore therein, a valve disposed in said bore, said valve having a passageway extending diametrically therethrough, and having an arcuate groove in its outer wall disposed in axially-spaced relationship to said passageway, a ball in said housing, and spring means urging said ball into said groove.

5. In a clamping device, a clamping rod, fluid-actuated means for actuating said clamping rod, a wick oiler, a ball check valve for controlling the flow of oil from said oiler, said valve being operable in response to flow of said fluid for lubricating the fluid-actuated means.

6. In a clamping device, a housing, a clamping member movable in said housing, between clamping and unclamping positions, a cam for moving said member, a cam shaft for rotating said cam, and indexing means for setting said cam shaft in a position in which said clamping member is in clamping position, said indexing means comprising a cap on one end of said cam shaft, said cap having a pair of circumferentially-spaced index marks, and a fixed index mark on said housing, said cam shaft being rotatable to a position in which the fixed index mark is halfway between said spaced index marks on said cap, in which position the clamping member is in its clamping position.

7. In a clamping device, a housing having a bore therein, a valve disposed in said bore, said valve having a passageway extending diametrically therethrough, and an arcuate groove in its outer wall disposed in axially-spaced relationship to said passageway, a ball in said housing, spring means urging said ball into said groove and a set screw accessible from the exterior of said housing for retaining said spring means in place.

8. In a clamping device, a clamping rod, a fluid-actuated means for actuating said clamping rod, an oil supply, a check valve for controlling the flow of oil from said oil supply, said valve operable in response to flow of said fluid for lubricating the fluid-actuated means, said valve being self-closing upon cessation of flow of said fluid.

References Cited in the file of this patent

UNITED STATES PATENTS

| | | |
|---|---|---|
| 2,070,899 | Hamer | Feb. 16, 1937 |
| 2,153,998 | Verderber et al. | Apr. 11, 1939 |
| 2,203,162 | Lee | June 4, 1940 |
| 2,214,324 | Goldberg | Sept. 10, 1940 |
| 2,224,708 | Van Sittert | Dec. 10, 1940 |
| 2,417,625 | Bates | Mar. 18, 1947 |
| 2,678,072 | Verderber | May 11, 1954 |
| 2,681,581 | Pearson | June 22, 1954 |